(12) United States Patent
Errera

(10) Patent No.: US 11,963,544 B1
(45) Date of Patent: Apr. 23, 2024

(54) CUSTOM MESSAGE FOOD PRESS DEVICE

(71) Applicant: Richard Ben Errera, Arvada, CO (US)

(72) Inventor: Richard Ben Errera, Arvada, CO (US)

(73) Assignee: Gourmet Impressions LLC, Arvada, CO (US)

( * ) Notice: Subject to any disclaimer, the term of this patent is extended or adjusted under 35 U.S.C. 154(b) by 0 days.

(21) Appl. No.: 18/138,725

(22) Filed: Apr. 24, 2023

Related U.S. Application Data

(60) Provisional application No. 63/433,068, filed on Dec. 16, 2022.

(51) Int. Cl.
| A23P 30/10 | (2016.01) |
| A21C 11/02 | (2006.01) |
| A21C 11/12 | (2006.01) |

(52) U.S. Cl.
CPC ............ A23P 30/10 (2016.08); A21C 11/02 (2013.01); A21C 11/12 (2013.01); A23V 2300/31 (2013.01)

(58) Field of Classification Search
CPC .......... A23P 30/10; A21C 11/02; A21C 11/04; A21C 11/06; A21C 11/08; A21C 11/12
See application file for complete search history.

(56) References Cited

U.S. PATENT DOCUMENTS

| | | | | |
|---|---|---|---|---|
| 2,246,424 A | * | 6/1941 | Turner | A21C 11/106 30/301 |
| 2,346,242 A | * | 4/1944 | Turner | A21C 11/10 30/301 |
| 2,008,725 A | * | 7/1953 | Parker | A22C 7/0076 D7/672 |
| 2,820,423 A | * | 1/1958 | Catuccio | A22C 7/00 425/436 R |
| 2,920,583 A | * | 1/1960 | Carpenter | A21C 5/00 16/33 |
| 2,977,901 A | * | 4/1961 | Deary, Sr. | A21C 11/14 99/485 |
| 4,091,720 A | * | 5/1978 | Wheeler | A47J 37/0611 219/524 |
| 4,327,489 A | * | 5/1982 | Conrad | A21C 11/106 D7/676 |
| 4,362,497 A | * | 12/1982 | Lifshitz | A21C 11/00 425/383 |
| 4,384,838 A | * | 5/1983 | Laughlin | A21C 11/106 249/102 |
| 4,516,923 A | * | 5/1985 | Lifshitz | A21C 9/066 425/383 |
| 5,054,389 A | * | 10/1991 | Kuhlman | B31F 1/07 101/28 |
| 5,181,464 A | * | 1/1993 | Kuhlman | B44B 5/0033 101/28 |

(Continued)

*Primary Examiner* — Seyed Masoud Malekzadeh
(74) *Attorney, Agent, or Firm* — Christopher Pilling

(57) ABSTRACT

A custom message food press is provided. The device is a hand held debossing, embossing, and impressing device having culinary and other uses to impress or imprint names, messages, logos, artwork, and designs into or onto food or other substrates. The device includes an ejection panel configured to remove a plurality of impression elements from a peg board carrier plate. The carrier plate is configured to hold the plurality of impression elements in a particular set arrangement for impressing into or onto the food. A cleaning crate is configured to act as the base of the device by attaching everything together for cleaning and storage.

9 Claims, 18 Drawing Sheets

(56) References Cited

U.S. PATENT DOCUMENTS

| | | | | |
|---|---|---|---|---|
| 5,303,473 A * | 4/1994 | Sadler | A21C 11/106 30/130 |
| 6,381,852 B1 * | 5/2002 | Wallays | A21C 15/04 206/349 |
| 6,990,892 B2 * | 1/2006 | Errera | A21C 11/106 99/349 |
| 7,331,776 B2 * | 2/2008 | Errera | A21C 11/02 52/223.13 |
| 7,343,854 B2 * | 3/2008 | Nadal-Linares | A47J 43/20 100/234 |
| 8,230,604 B1 * | 7/2012 | Corey | B25G 3/08 30/301 |
| 8,287,265 B2 * | 10/2012 | Errera | A47J 43/20 249/141 |
| 8,695,220 B2 * | 4/2014 | Rhoads | B26B 29/063 30/299 |
| 8,926,306 B2 * | 1/2015 | Harrison | A47J 43/20 425/278 |
| 8,956,138 B2 * | 2/2015 | Myoung | A21C 11/12 425/383 |
| 9,044,026 B2 * | 6/2015 | Bakhoum | A21C 11/08 |
| 9,687,019 B2 * | 6/2017 | Imlach | A47J 43/20 |
| 9,730,457 B2 * | 8/2017 | Serebryany | A21C 11/10 |
| 10,182,681 B1 * | 1/2019 | Hart | A23G 1/0076 |
| 10,667,651 B2 * | 6/2020 | Murphy | A23P 30/10 |
| 10,842,319 B2 * | 11/2020 | Cohen | A21D 13/43 |
| 10,888,106 B2 * | 1/2021 | Frank | A21C 15/002 |
| 11,464,365 B2 * | 10/2022 | Cohen | A21D 13/47 |
| 2001/0031302 A1 * | 10/2001 | Balkos | A22C 7/00 100/910 |
| 2002/0031591 A1 * | 3/2002 | Kerrigan | A23L 9/12 426/582 |
| 2004/0040446 A1 * | 3/2004 | Errera | A21C 14/00 99/388 |
| 2008/0241326 A1 * | 10/2008 | Ekberg | A21C 11/06 99/485 |
| 2009/0205514 A1 * | 8/2009 | Cheng | B26D 7/2614 30/114 |
| 2010/0068321 A1 * | 3/2010 | Errera | A47J 43/20 425/96 |
| 2011/0283548 A1 * | 11/2011 | White | A21C 11/106 30/301 |
| 2012/0042519 A1 * | 2/2012 | Goode | A21C 15/00 30/124 |
| 2013/0078343 A1 * | 3/2013 | Riggio | A21C 11/12 426/503 |
| 2014/0017350 A1 * | 1/2014 | Myoung | A21C 11/00 425/183 |
| 2016/0029688 A1 * | 2/2016 | Budek | A23P 30/10 425/437 |
| 2018/0317711 A1 * | 11/2018 | Cohen | B29C 59/02 |
| 2020/0390281 A1 * | 12/2020 | Cohen | A47J 37/0892 |
| 2021/0259473 A1 * | 8/2021 | Dixon | A47J 43/20 |
| 2021/0339418 A1 * | 11/2021 | Tatum | B26D 1/25 |

* cited by examiner

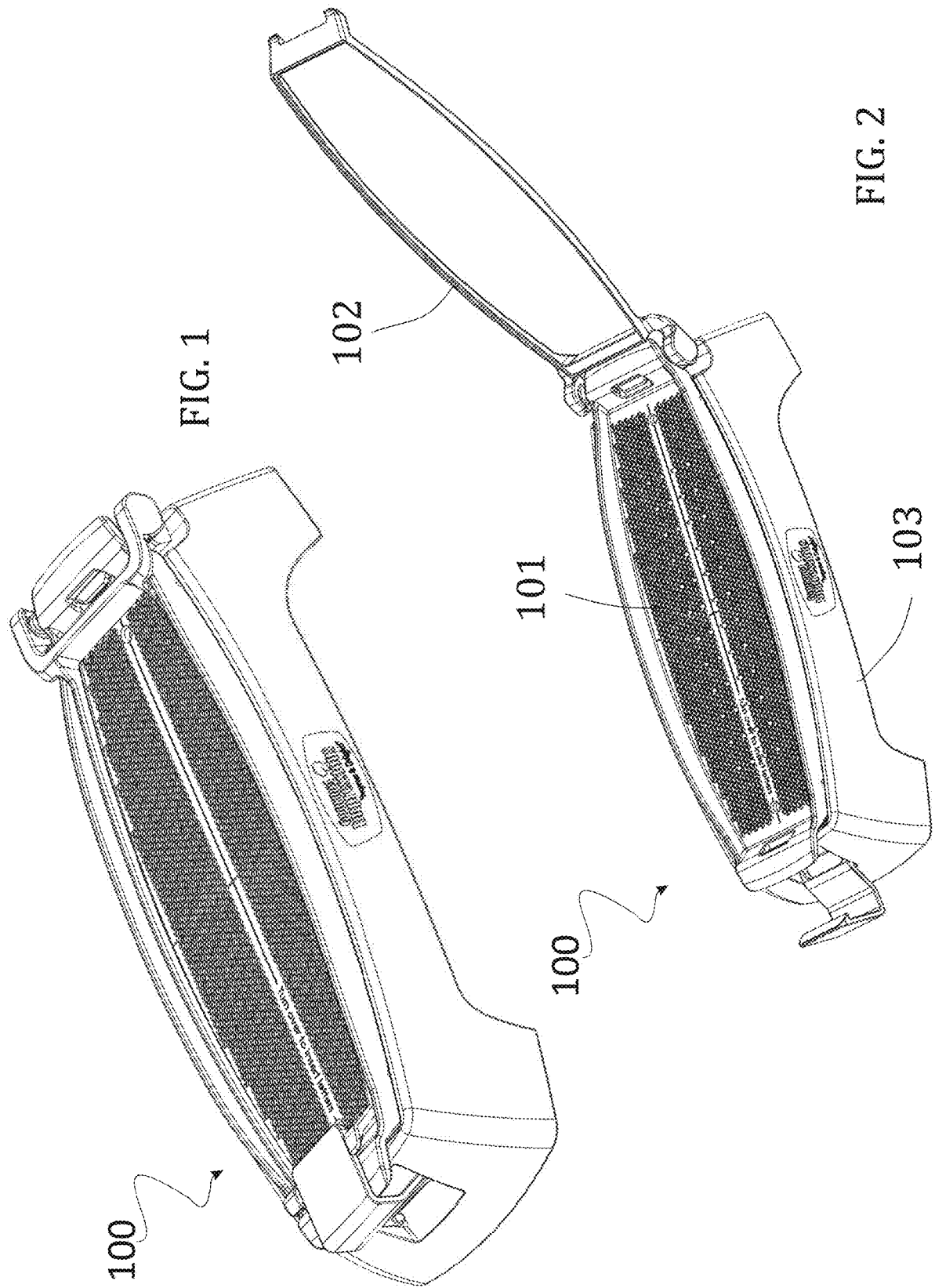

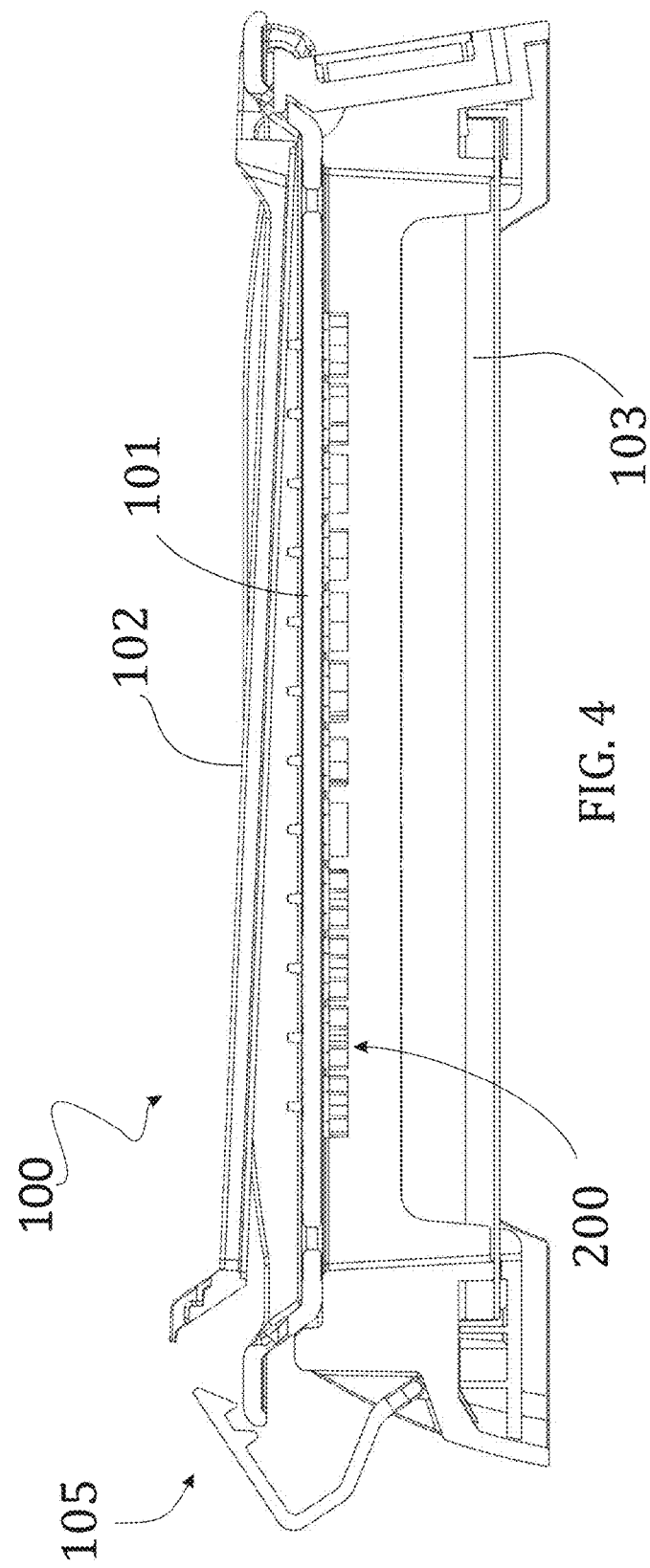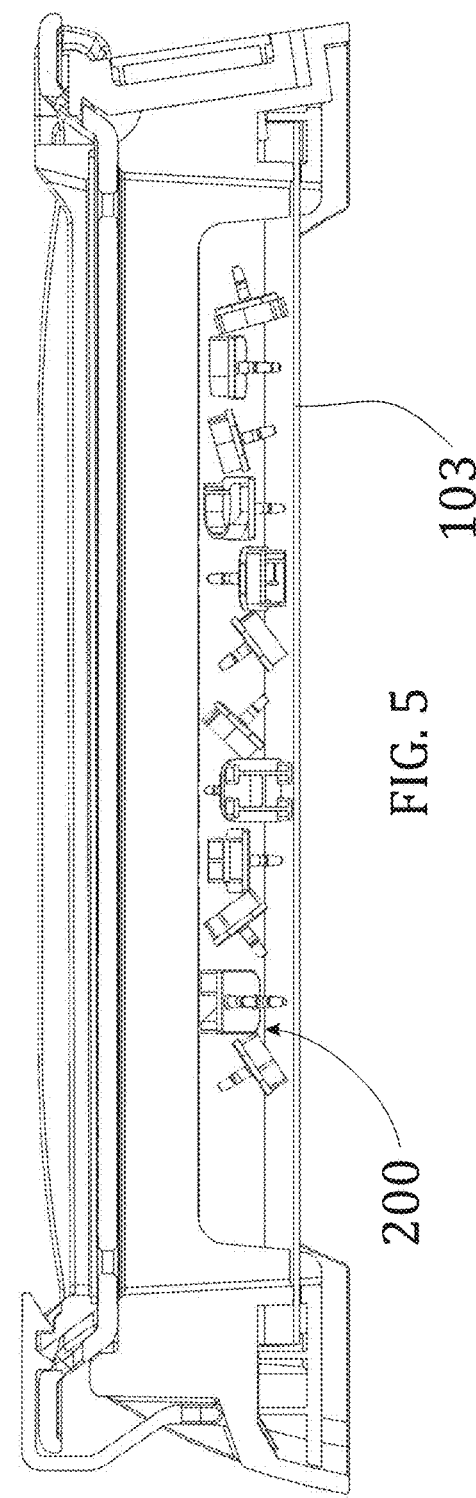

Mesh

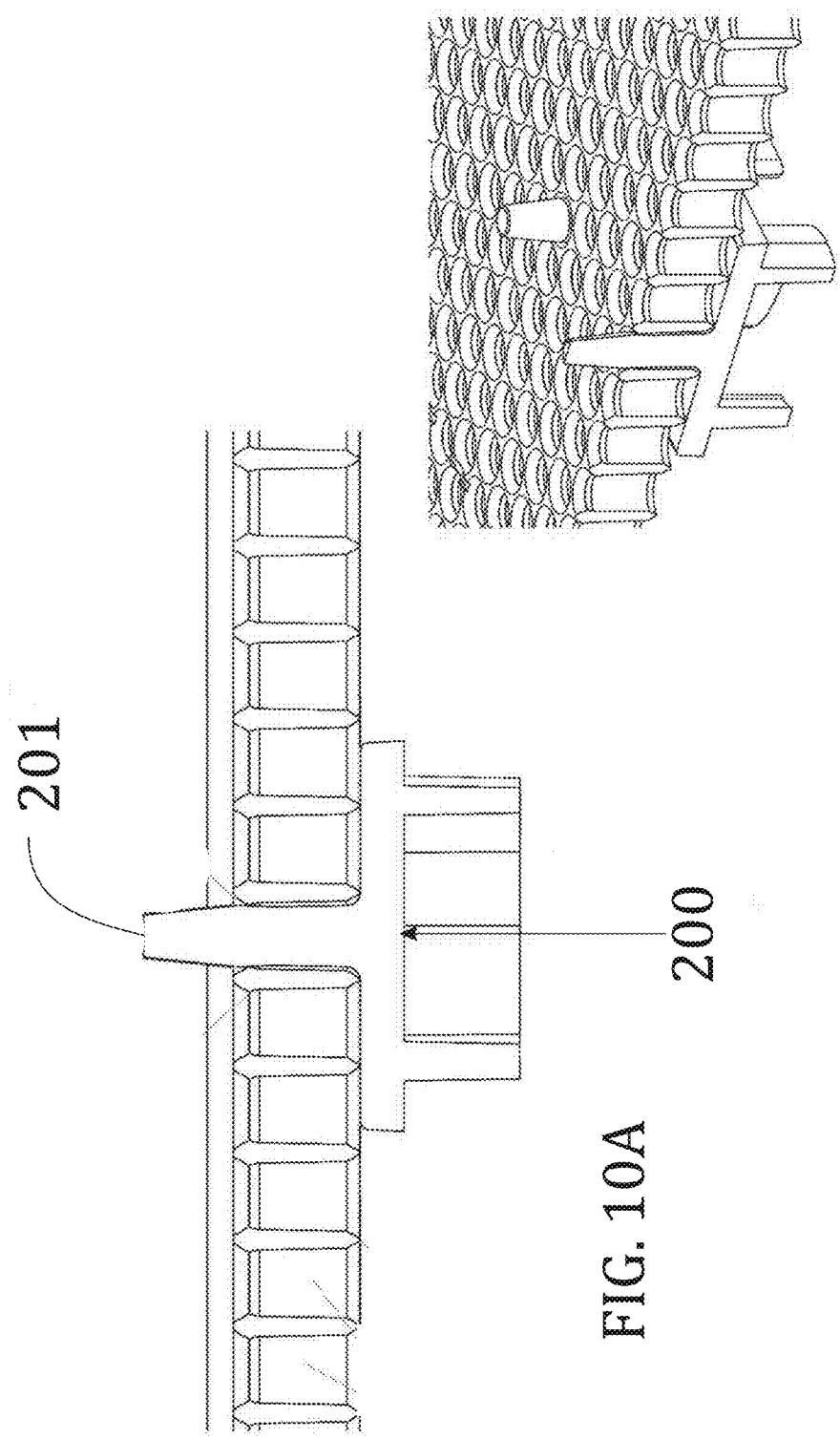

CUSTOM MESSAGE FOOD PRESS DEVICE

CROSS-REFERENCE TO RELATED APPLICATIONS

The present invention claims priority to provisional application Ser. No. 63/433,068 filed Dec. 12, 2022, which is hereby incorporated at least by reference.

BACKGROUND OF THE INVENTION

1. Field of the Invention

The present invention relates to food decorating, but more particularly to a custom message food press device.

2. Description of Related Art

Humans have long decorated food in many ways including adding messages, designs, and artwork onto food. One of the ways is to imprint, deboss, or emboss by pressing a negative or positive shaped image of the intended artwork or design into or onto the food or other media that will accept such an impression, like fondant icing. A method used to create custom messages uses a set of alpha-numeric symbols that can be custom arranged in any order desired. Most of the products on the market with the ability to create custom messages are difficult to manage, time-consuming to use, and would not be suitable for commercial use by the user. These products do not meet the challenges and difficulties in using them. Consequently, a solution is provided.

BRIEF SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

The present invention provides novel features in the food impression field. In some embodiments, the device includes a peg and perforation mechanical connection between a plurality of impression elements and peg board carrier plate. In some embodiments, the device includes an ejection panel to quickly and easily remove the impression elements from the peg board carrier plate. In some embodiments, the device includes a cleaning crate acting as a base to hold the device elements together for cleaning and storage. The combination of elements are used to facilitate impressing custom messages into food or other media.

In one aspect of the invention, a custom message food press device is provided, the device comprising at least one impression element configured to impress into a food substrate; a base having a top opening; a carrier plate having an attachment surface configured to enable the attachment of the at least one impression element arranged for use on the carrier plate such that a custom message may be impressed into the food substrate by a user; and, an ejector panel configured to eject the attached at least one impression element from the carrier plate into the base through the top opening, wherein the ejector panel and the carrier plate are configured to removably attach to the base via an attachment mechanism.

In one embodiment, the base includes a bottom mesh surface. In another embodiment, the base acts as a cleaning crate and storage area for the at least one impression element. In yet another embodiment, the bottom mesh surface enables water to pass though the base when the base is functioning as the cleaning crate. In one embodiment, the at least one impression element includes a first side having imprinting geometry and a second side having a peg, wherein the first side is opposite the second side. In another embodiment, the carrier plate includes a plurality of peg receiving holes, wherein each peg receiving hole is configured to removably attach the peg. In one embodiment, the ejector panel is constructed from a transparent material. In another embodiment, the ejector panel is constructed from a thin flexible material. In one embodiment, the attachment mechanism is a snap-fit mechanism. In one embodiment, the attachment mechanism is a latch mechanism. In one embodiment, the imprinting geometry includes a raised perimeter edge. In one embodiment, the carrier plate is configured for double-sided use.

The foregoing has outlined rather broadly the more pertinent and important features of the present disclosure so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present disclosure. It should be realized by those skilled in the art that such equivalent structures do not depart from the spirit and scope of the invention as set forth in the appended claims.

BRIEF DESCRIPTION OF THE SEVERAL VIEWS OF THE DRAWINGS

Other features and advantages of the present invention will become apparent when the following detailed description is read in conjunction with the accompanying drawings, in which:

FIG. 1 is a perspective view of the custom message food press device according to an embodiment of the present invention.

FIG. 2 is a perspective view of FIG. 1 with the ejector panel open and in an unlatched position, and a plurality of impression elements attached to the peg board carrier plate.

FIG. 4 is a front sectional view of FIG. 3.

FIG. 5 is a front sectional view of FIG. 1 with the ejector panel fully closed and latched, the plurality of impression elements are loosely contained within the cleaning crate for cleaning and storage.

FIG. 10A is a detailed sectional view of the peg board carrier plate according to an embodiment of the present invention.

FIG. 10B is a detailed perspective view of FIG. 10A.

DETAILED DESCRIPTION OF THE PREFERRED EMBODIMENT

Figure 3:
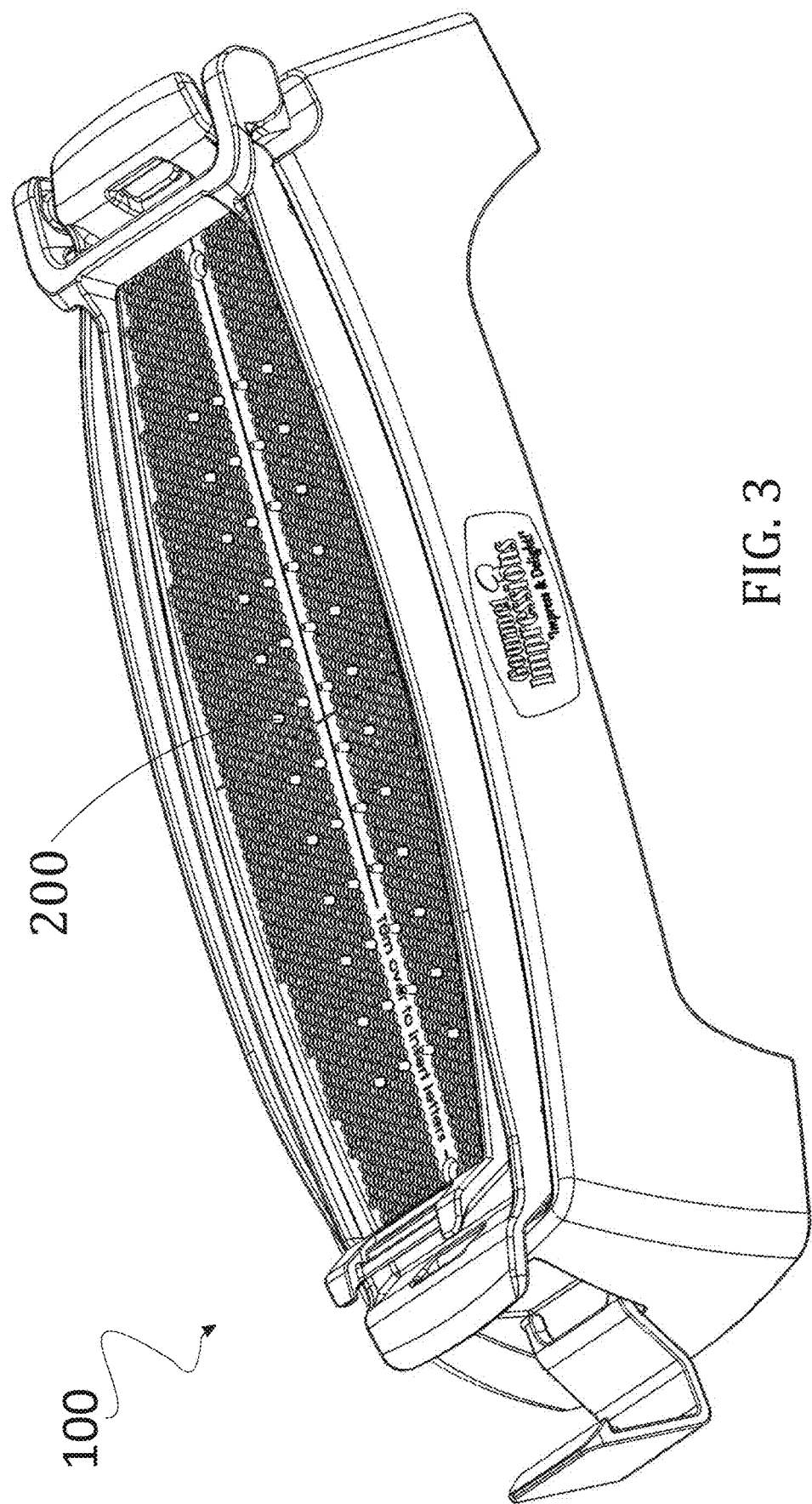
FIG. 3 is a perspective view of FIG. 2 with the ejector panel rotated down such that it makes contact with the top of the pegs of the plurality of impression elements.
Figure 6:
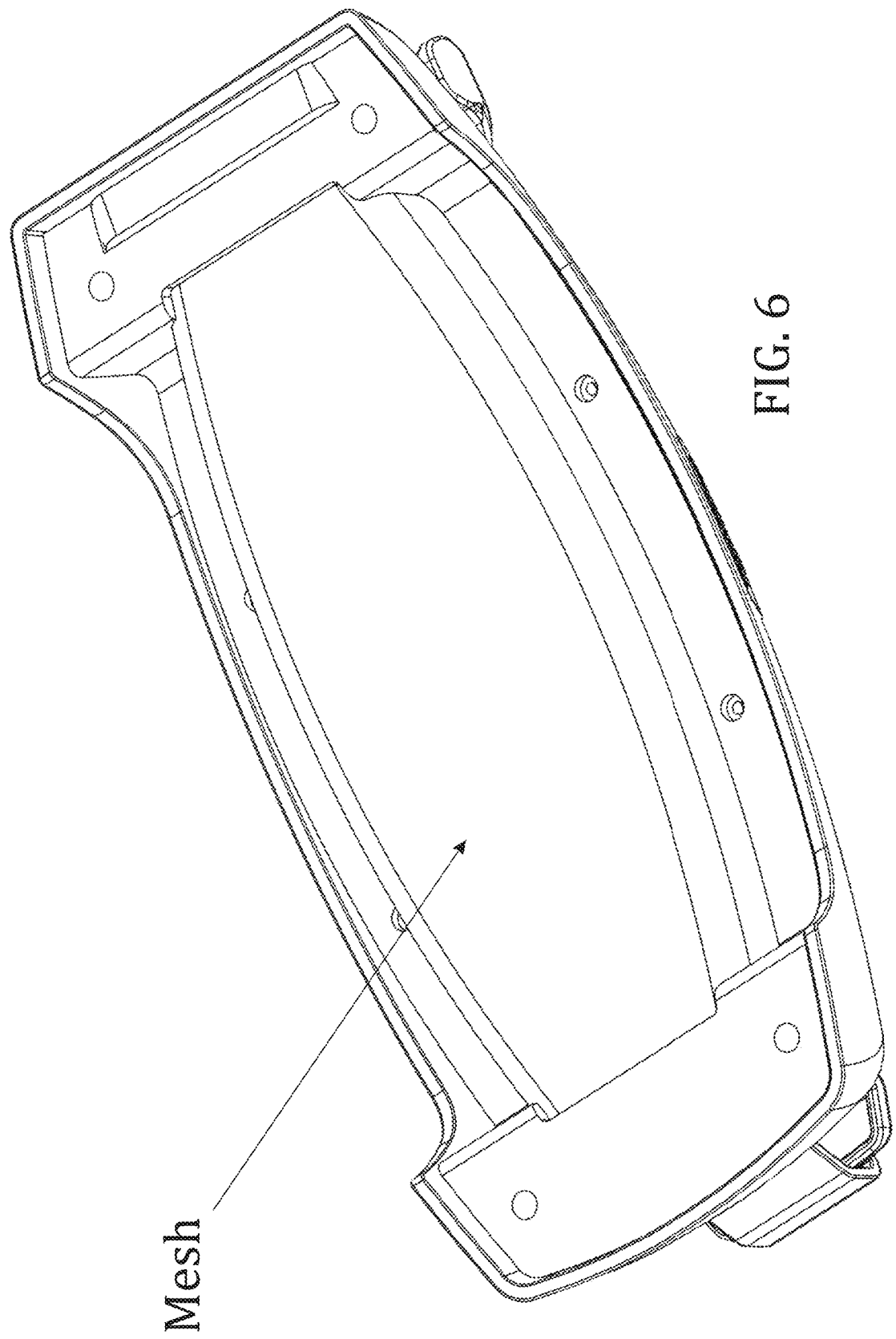
FIG. 6 is a bottom perspective view of FIG. 1.
Figure 7:
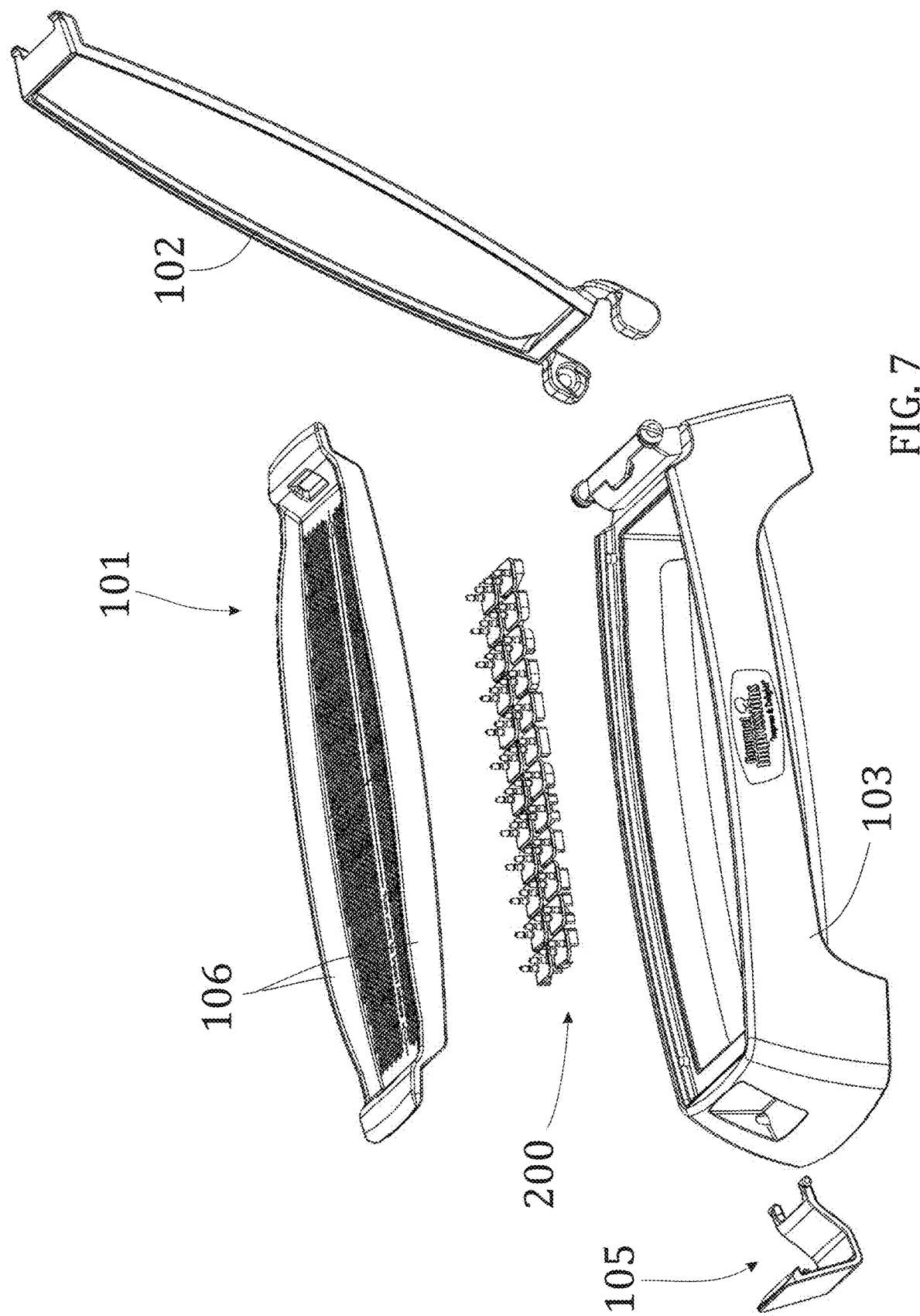
FIG. 7 is an exploded view of the custom message food press device according to an embodiment of the present invention.

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein to specifically provide a custom message food press device.

It is to be understood that the terminology used herein is for the purpose of describing particular embodiments only and is not intended to be limiting. The terms "a" or "an," as used herein, are defined as to mean "at least one." The term "plurality," as used herein, is defined as two or more. The term "another," as used herein, is defined as at least a second or more. The terms "including" and/or "having," as used herein, are defined as comprising (i.e., open language). The term "providing" is defined herein in its broadest sense, e.g., bringing/coming into physical existence, making available, and/or supplying to someone or something, in whole or in multiple parts at once or over a period of time. These terms generally refer to a range of numbers that one of skill in the art would consider equivalent to the recited values (i.e., having the same function or result). In many instances these terms may include numbers that are rounded to the nearest significant figure.

Referring now to any of the accompanying FIGS. 1-11, the custom message food press 100 is a hand held debossing, embossing, and impressing device having culinary and other uses to impress/imprint names, messages, logos, artwork, and designs into or onto food media, as well as other receptive to receive impressions media such as wax, soap, and similar receptive to be impressed materials that are able to be penetrated (debossed into, or embossed above) for the impression. The present invention comprises three main components which will be discussed in detail throughout the disclosure. In one embodiment, the device 100 comprises an ejection panel or lid 102, a peg board carrier plate 101, a cleaning crate 103, and a plurality of impression elements 200. In one embodiment, the ejection panel 102 is configured to remove the plurality of impression elements 200 from the peg board carrier plate 100. In one embodiment, the peg board carrier plate 101 is configured to hold the plurality of impression elements 200 in a particular set arrangement for impressing into or onto the food or other receptive to be impressed, media material. In one embodiment, the cleaning crate 103 is configured to act as the base of the device by attaching everything together for cleaning and storage, wherein the cleaning crate 103 can be made of metal, plastic, ceramic, or other hard material.

Advantageously, the present invention disclosed is a system of parts that allows for fast, efficient and convenient use of creating and imprinting custom messages, and images suitable for professional, commercial, and home use. The present invention serves as a tool to enable the user to impress a nearly infinite number of unique custom or inserting "Standard Message" pads (e.g. "Happy Birthday", "Good Luck!" "Have A Great Day", "Get Well Soon", Made With Love" etc.), design, or artwork into or onto a wide variety of food media for their culinary creations as well as any other non-food media that will accept the impression. It improves on the currently available products by a number of features, including but not limiting to, offering more flexibility with custom messages, designs, logos, advertisements, and artwork while being much quicker, easier to use, clean, more durable, more substantial and more organized. It is dishwasher safe and FDA approved for food contact. It has features that when combined in the system, make for an ideal solution for the user, professional or not to impress a plethora of food and non-food materials.

Figure 8:
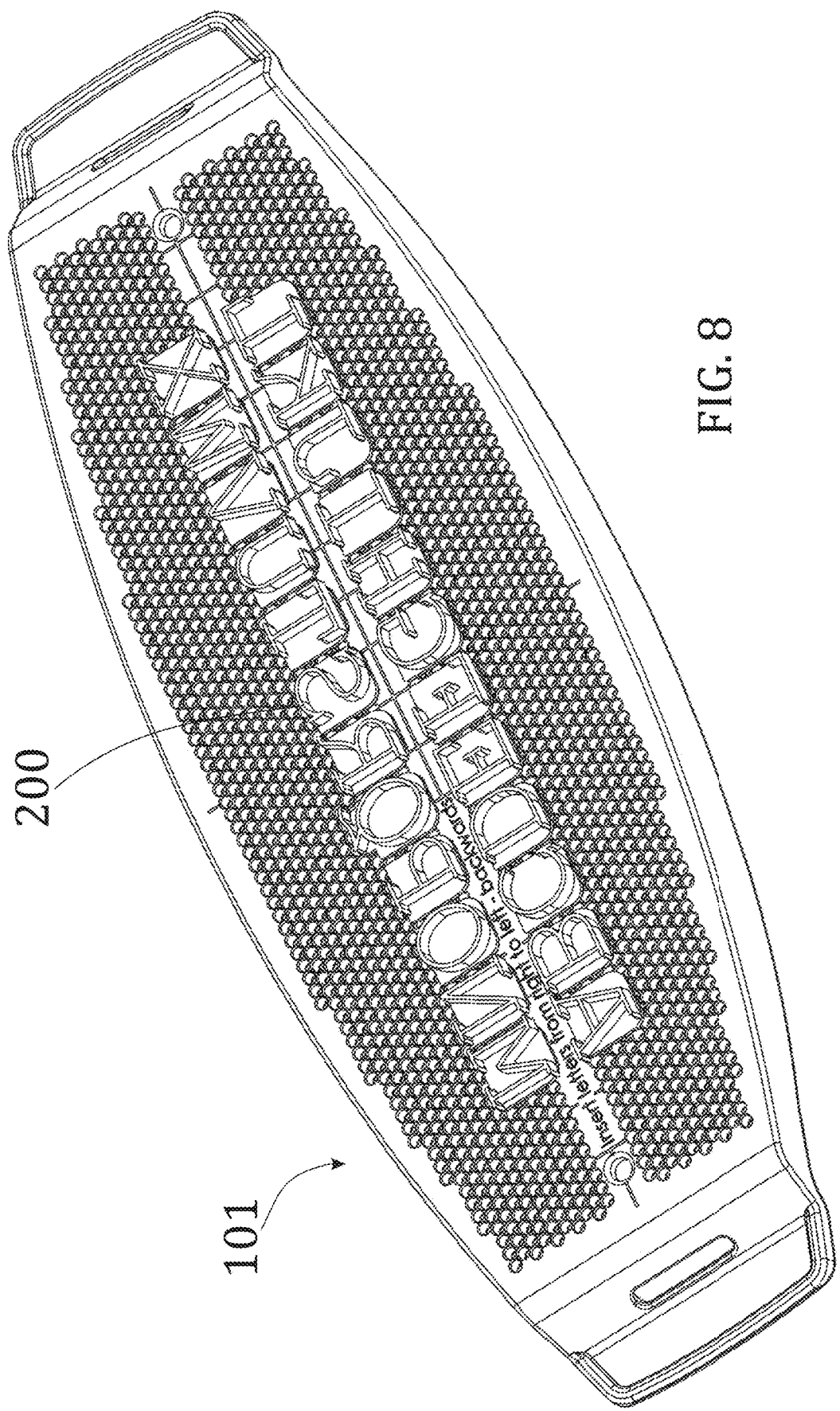
FIG. 8 is a bottom view of the carrier plate with an exemplary configuration of the plurality of impression elements arranged for a custom message during use according to an embodiment of the present invention.
Figure 9:
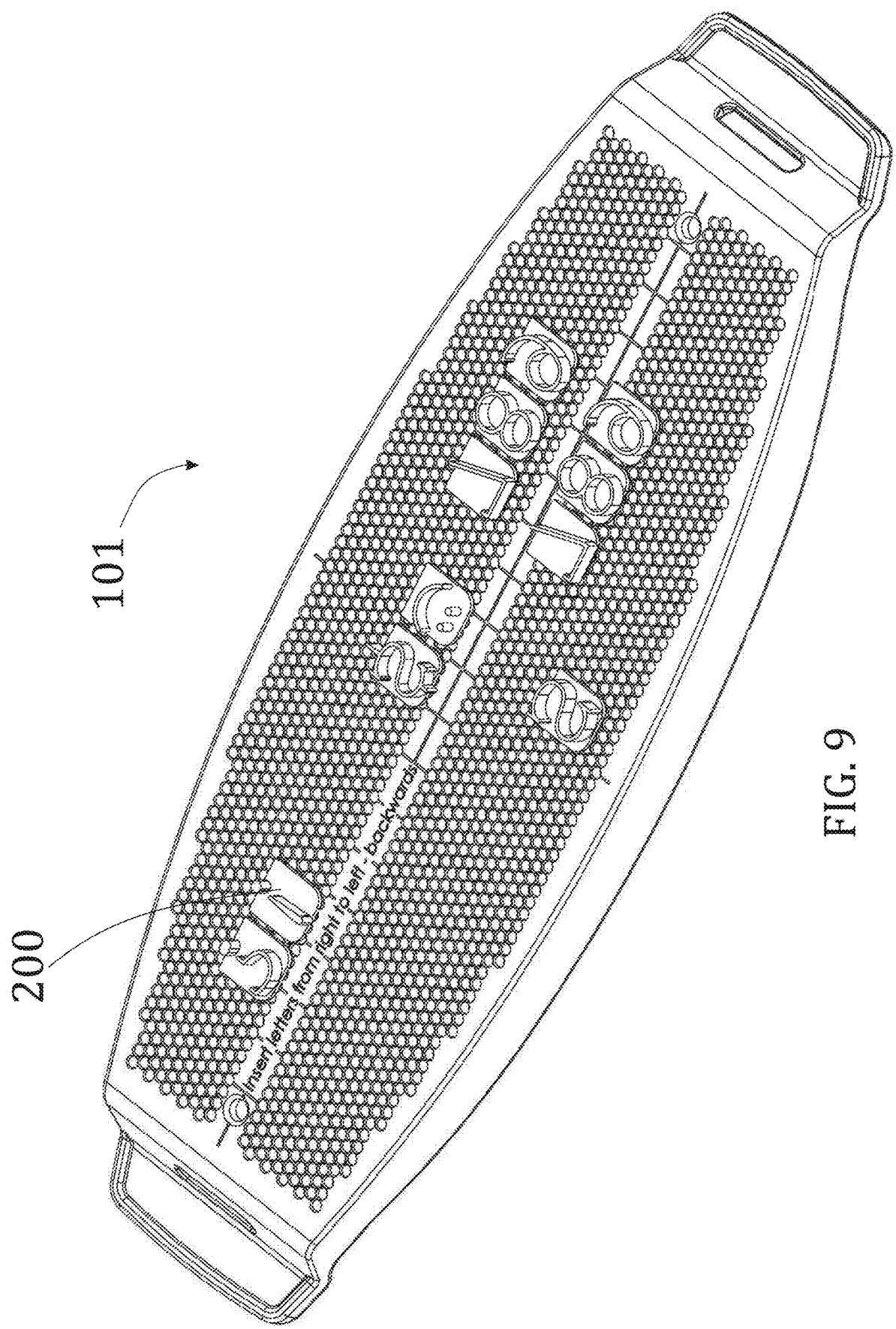
FIG. 9 is a bottom view of the carrier plate with a second exemplary configuration of the plurality of impression elements arranged for a custom message during use according to an embodiment of the present invention.

As previously discussed, the present invention is a device that allows the user to impress messages, designs, art work, and graphics into (debossing) or onto (embossing) a food substrate or material similar to accept the impression. In one embodiment, the present invention consists of a plurality of impression elements 200 defining various imprinting/impressing elements (e.g. "letters"), that can be arranged onto a peg board carrier plate 101, which can be used to imprint the arranged message or artwork onto a food media (as best seen in FIGS. 8-9). In some embodiments, an ejection panel 102 can be used to remove the plurality of impression elements 200 from the peg board carrier plate 101 and dispensed into the cleaning crate 103 for cleaning and storage (as best seen in FIG. 5).

As best seen in FIGS. 11A-D, the plurality of impression elements 200 are configured to contact food and other acceptable media to make a negative or positive impression of geometry. Each impression element for imprinting/impressing can vary, and one skilled in the art would appreciate the possibilities. For example, in some embodiments, the plurality of impression elements 200 include, but are not limited to, individual symbols (such as letters, numbers, punctuation marks, designs, special characters, emojis, or graphic elements), or message plates with predefined messages, advertisements, logos, designs, or graphics.

In one embodiment, each impression element connects to the device, and more specifically to the peg board carrier plate 101 with interference geometry to provide a snap-fit, mechanical connection via the at least one peg 201 of each impression element 200. The snap-fits connection is reversible by pushing on the back of the pegs 201 on the impression elements with enough force (e.g. using one's fingertips pressing down) to eject them from the carrier plate 101.

Figure 11B:
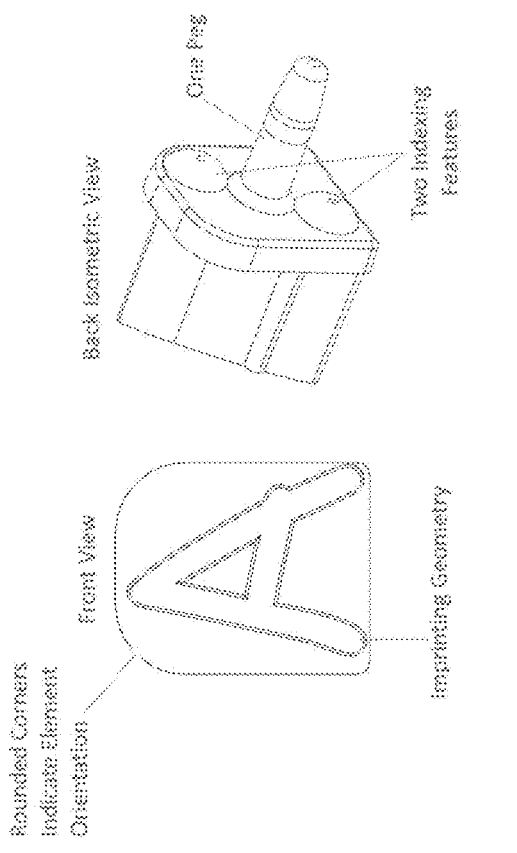
FIG. 11B is an exemplary impression element of the plurality of impression elements according to an embodiment of the present invention.
Figure 11A:
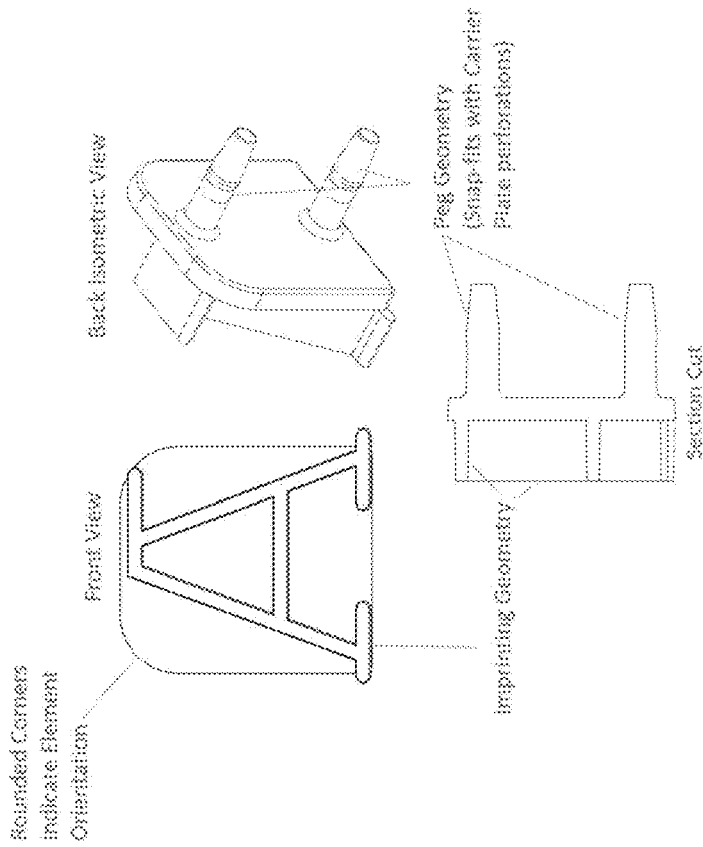
FIG. 11A is an exemplary impression element of the plurality of impression elements according to an embodiment of the present invention.
Figure 11C:
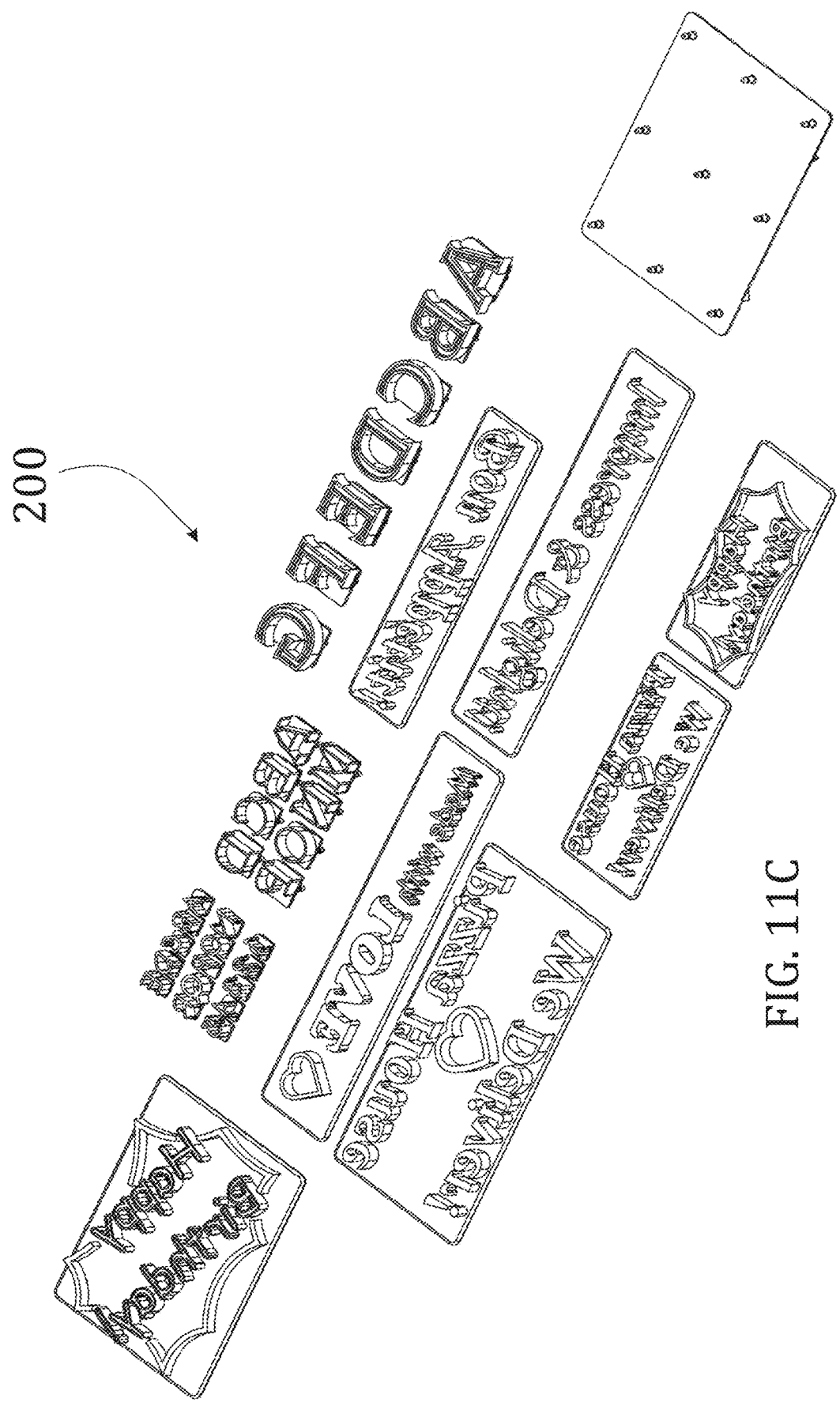
FIG. 11C are various impression elements of the plurality of impression elements according to an embodiment of the present invention.
Figure 11D:
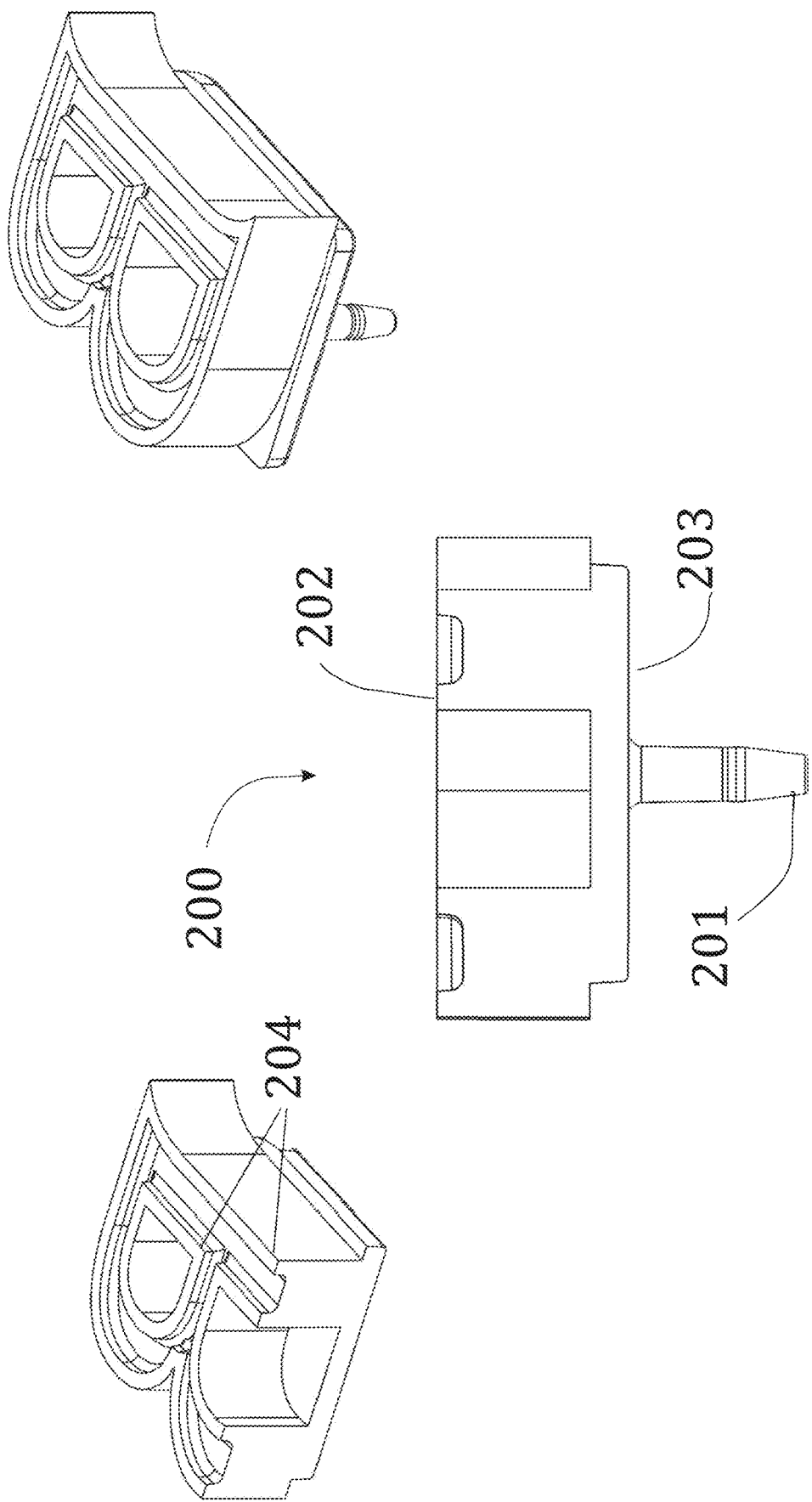
FIG. 11D is an exemplary impression element of the plurality of impression elements according to an embodiment of the present invention.

Best seen in FIG. 11D, in one embodiment, each impression element includes a first side 202 having geometry to impress into (deboss) or onto (emboss) a food or other receptive to be impressed media substrate that will accept the impression. In one embodiment, on the other side or second side 203, there is at least one peg protruding that mates to the peg board carrier plate (as best seen in FIGS. 10A-B). In some embodiments, the number of pegs 201 may vary, for example, on small impression elements (e.g. small "letters") only one peg may be needed, while on larger impression elements (e.g. "standard message pads"), two or more pegs may be used.

The pegs have a special geometry to help them snap to the peg board carrier plate, wherein the perforations in the peg board carrier plate have a geometric profile to mate with the pegs on the backside of each impression element. Advantageously, the impression elements utilize an interference fit or undercut to snap into place and be retained for use but can be removed when needed. The geometry and materials used should allow for many, repeated insertion and removal cycles of the impression elements into the peg board carrier plate.

It is important that the impression element be rigid enough to transfer the force applied to the back-side by the peg board carrier plate 101 to impress into or onto the food or other media (not illustrated). In one embodiment, the impression elements are made from a rigid plastic using injection-molding. In some embodiments, the impression elements are brightly colored to promote visibility and identifiable size which would be helpful in a messy, congested kitchen environment.

It should be understood that the impression elements may be of various sizes, such as from approximately 3 mm to over 100 mm in size, as well as various font styles known in the art. When the present invention was reduced to practice, various impression element cross-sectional geometries were created, prototyped, and tested on different food and receptive to receive impressions, other media. It was discovered that for impressing into soft doughs, which rise when baked, a letter geometry with a raised perimeter 202 (FIG. 11D) around the shape's perimeters allows for the best legibility after the dough is baked. This may be referred to as a "double-lined perimeter" geometry. It should be noted that other cross-sectional geometries could be used and may have benefits for using in certain food to receive impressions media substrates.

Advantageously, custom imprinting elements could be produced upon demand with a short lead-time using digital manufacturing technologies such as 3d printing, laser engraving, and CNC milling.

In one embodiment, the peg board carrier plate 101 is configured to be constructed from a material that is tough, durable and corrosion-resistant and can hold tight tolerances for the interference fit with the impression elements. Although a material such as stainless steel could be used, a transparent material is preferred, such as PETg polymer or polycarbonate polymer as transparency of the peg board carrier plate is helpful to the user to provide visibility through the peg board carrier plate to the food or other media to assist in placement of the intended message on that media.

In one embodiment, the peg board carrier plate 101 is a flat panel with numerous perforations arranged in a large grid. In some embodiments, these perforations would be in a nested grid, equally spaced by approximately 3 mm from each other, with a break in the grid pattern of a few rows down the longitudinal center axis. This grid arrangement and spacing allows for a wide variety of placement options for the impression elements while still providing alignment guidance for the user. a gentle curve on the longitudinal edges of the carrier plate is for aesthetic styling. markings can be applied to the peg board carrier plate for instruction and guidance and to help the user to align the messages they create on the peg board carrier plate and with the food or other receptive for impressing media.

It should be understood that the size of the peg board carrier plate 101 may vary, but in the one embodiment it is approximately 10 inches long and approximately 4 inches at its widest point, wherein this specified size is large enough to accommodate most any typical food and other media and custom messages, while also being easy to handle, operate and store in a kitchen environment.

In some embodiments, although not necessary for the invention to operate, in some embodiment, there are two handles 104 on the peg board carrier plate 101 (one on each end) to help the user hold and manipulate the peg board carrier plate 101 without accidentally contacting the food or other receptive to receive impressions media in an unintended way. The peg board carrier plate 101 must be rigid enough to transfer the force applied by the user holding these handles to the impression elements 200 located in the center of the peg board carrier plate 101 to press into or onto the food media without substantial deflection. To achieve this, the peg board carrier plate 101 is made with thick plastic, approximately 4.5 mm thick, and has thick ribs 106 running down the longitudinal edges, connecting to the handles and rigidizing the part.

To assist with the ejection of impression elements after use, an ejection panel 102 is provided. In some embodiments, the ejection panel 102 can be rigid or flexible. In one embodiment, the ejection panel 102 uses a semi-flexible material made from a translucent or transparent plastic, wherein the transparency affords visual feedback on which impression elements 200 have been removed from the peg board carrier plate 101 and which still remain attached. The semi-flexible nature of the ejection panel 102 allows for the force applied by the user's finger-tips to be distributed over an small area of approximately 4 square centimeters. This reduces the pressure on the user's finger-tips while applying enough force to the back of the impression elements to eject them from the peg board carrier plate.

In some embodiments, the ejection panel 102 is attached to the cleaning crate 103 with a hinge connection to allow it to rotate. When rotated fully outward, the peg board carrier plate 101 can be inserted or removed from the cleaning crate 103. When the ejection panel 102 is rotated fully inward it can be used to eject the impression elements 200 from the peg board carrier plate 101 or as a lid to close the opening on the top of the cleaning crate 103.

In some embodiments, a latch mechanism 105 on the cleaning crate 103 can be used to secure either or both the carrier plate 101 and ejection panel 102 to the cleaning crate 103. The ejection panel 102 can be removed from the cleaning crate 103 without the use of tools. In one embodiment, the ejection panel 102 is flexible enough to be snapped on or off of the hinge connection of the latch mechanism 105 with the cleaning crate 103.

The purpose of the cleaning crate 103 is to allow the user to quickly and easily hold, remove the impression elements, clean and store them, even having the ability to air dry after sink or dish washing cleaning. Advantageously, the cleaning crate 103 can be placed directly into the sink or dishwasher.

In one embodiment, the cleaning crate 103 has geometry to receive and hold the perimeter of the peg board carrier plate 101 a short distance above a table-top surface. There is an opening in the cleaning crate in which ejected impression elements can fall and be retained within the cleaning crate 103 for storage and cleaning. The underside of the cleaning crate 103 has a mesh surface to contain the impression elements while allowing water, air and food particles to pass through for a more thorough cleaning. In one embodiment, the mesh must have a grid size small enough to not allow the smallest of the impression elements through. In one embodiment, the mesh is made from stainless steel wire to allow for the maximum open area percentage on the mesh material while still maintaining strength, rigidity and corrosion resistance. It should be understood that other materials may be used.

Figure 12:
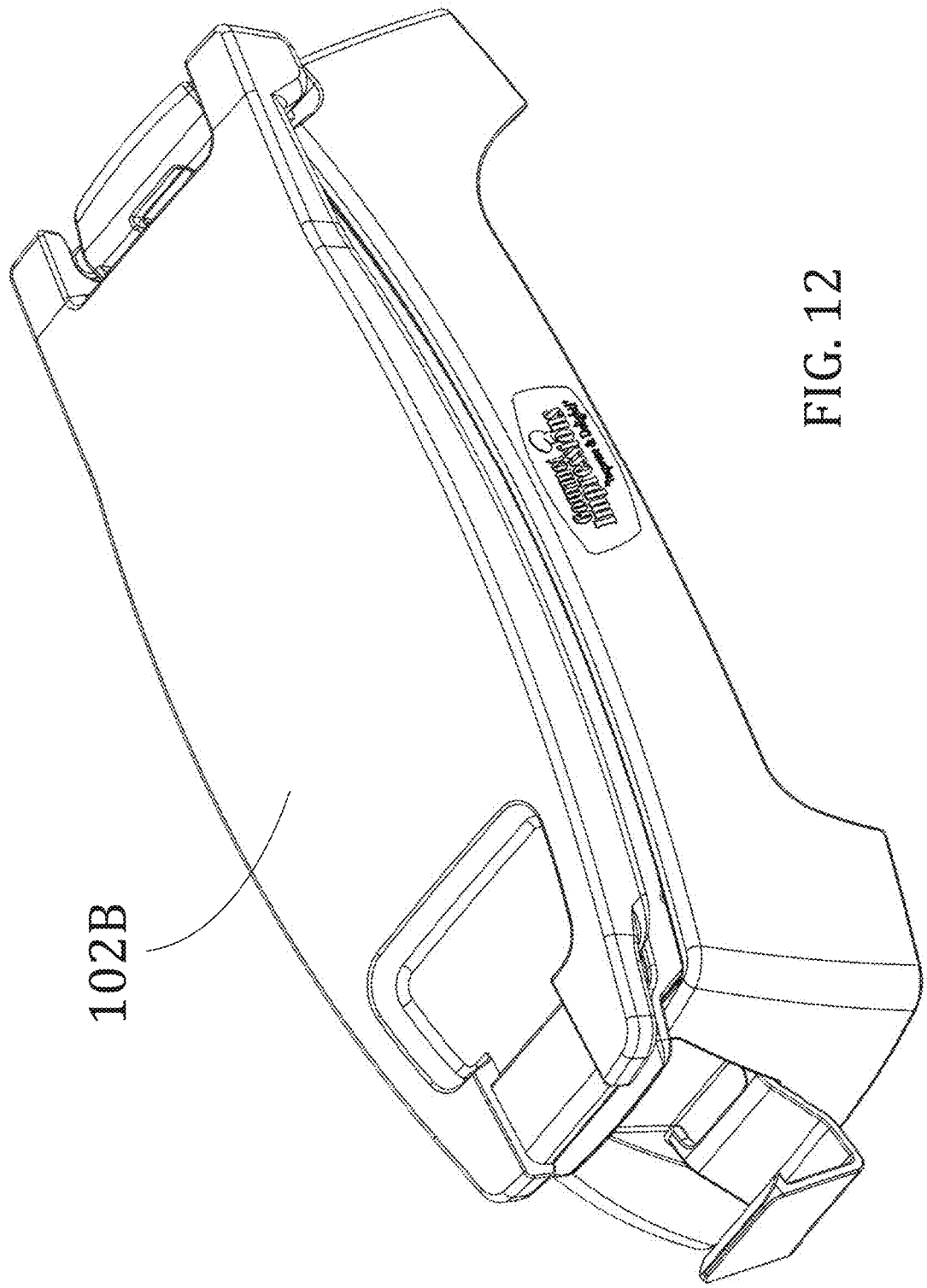
FIG. 12 is a perspective view of the custom message food press device with an alternate ejector panel according to an embodiment of the present invention.
Figure 13:
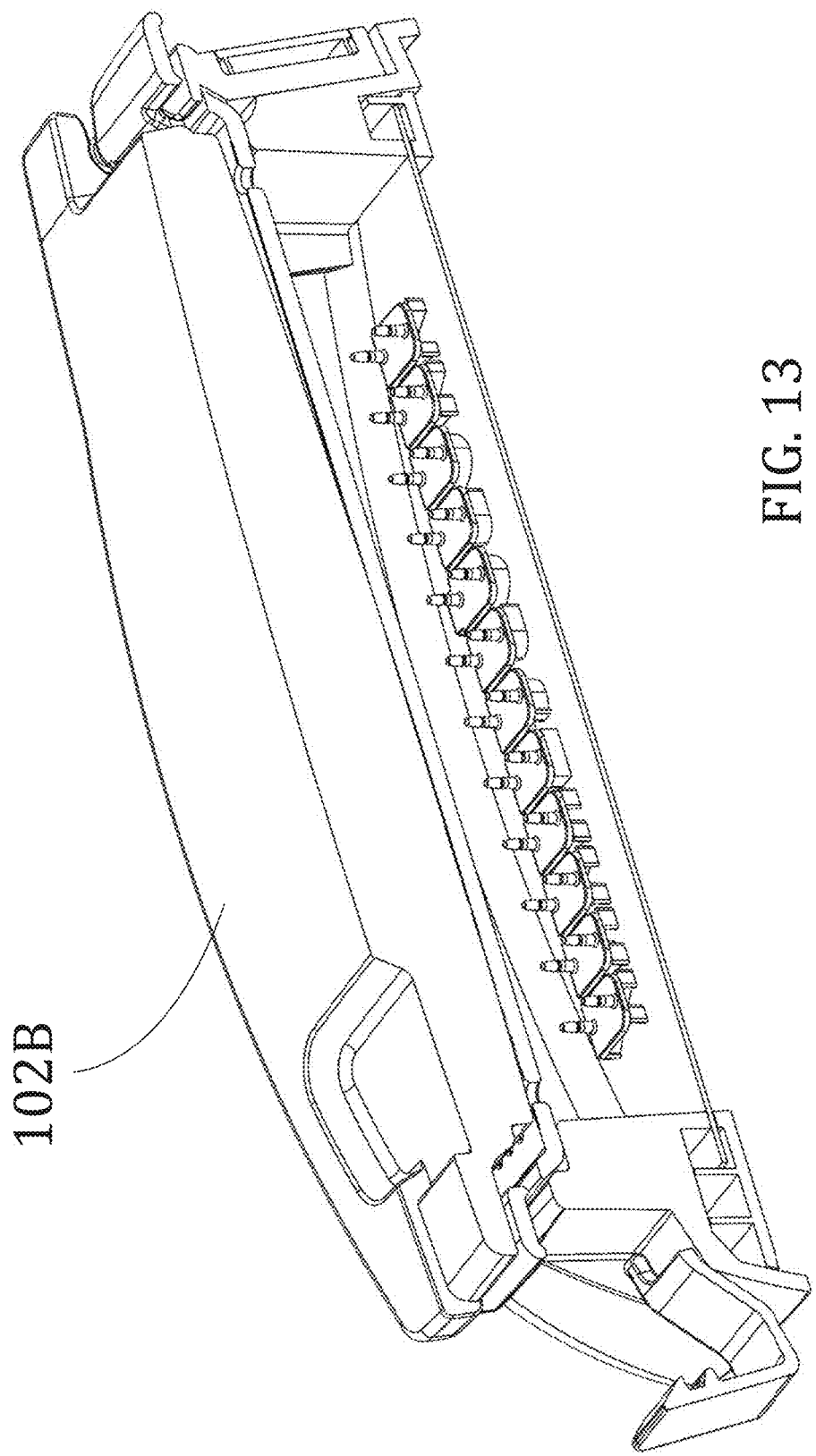
FIG. 13 is a sectional view of FIG. 12.
Figure 14:
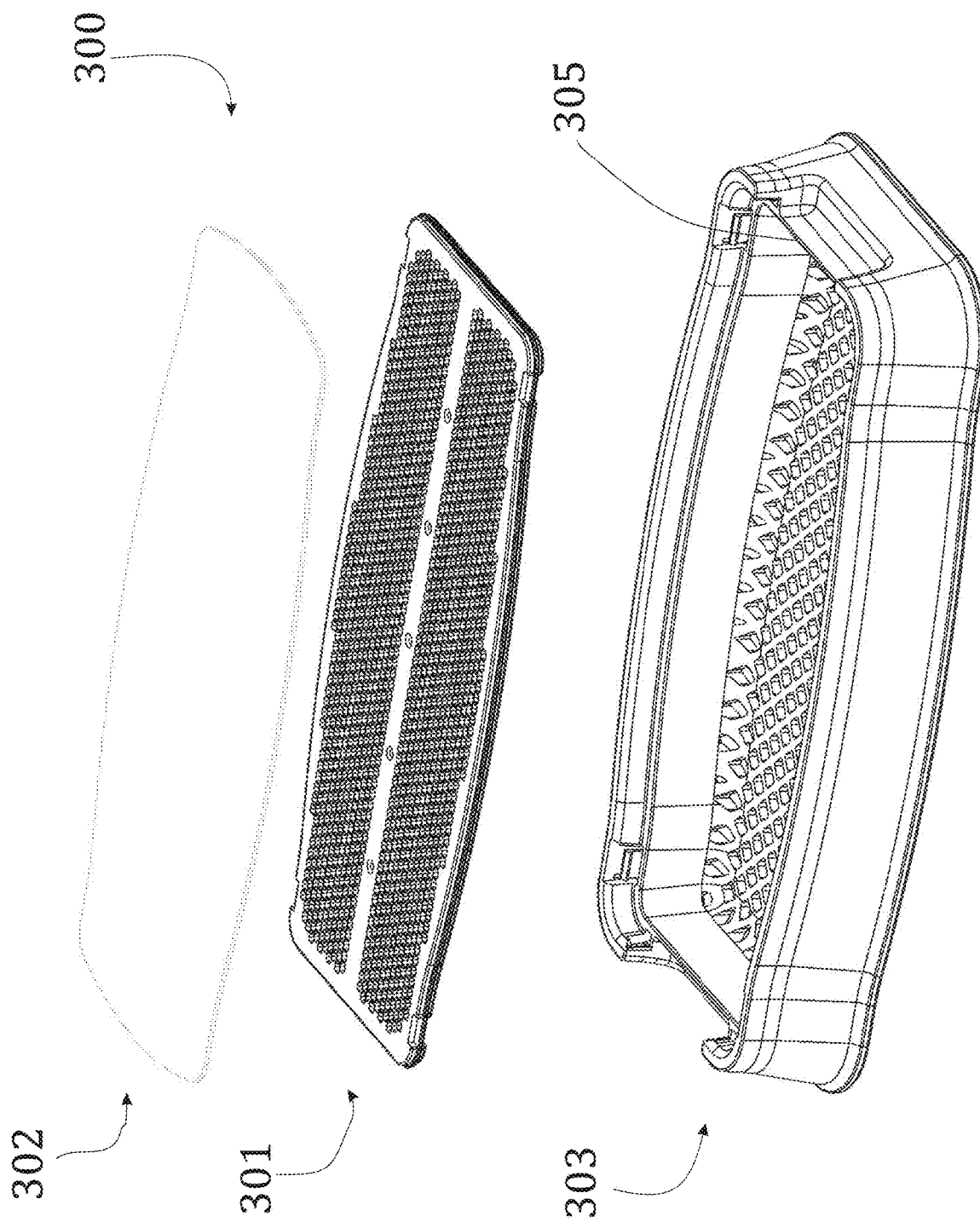
FIG. 14 is an exploded view of an alternative custom message food press device according to an embodiment of the present invention.
Figure 15:
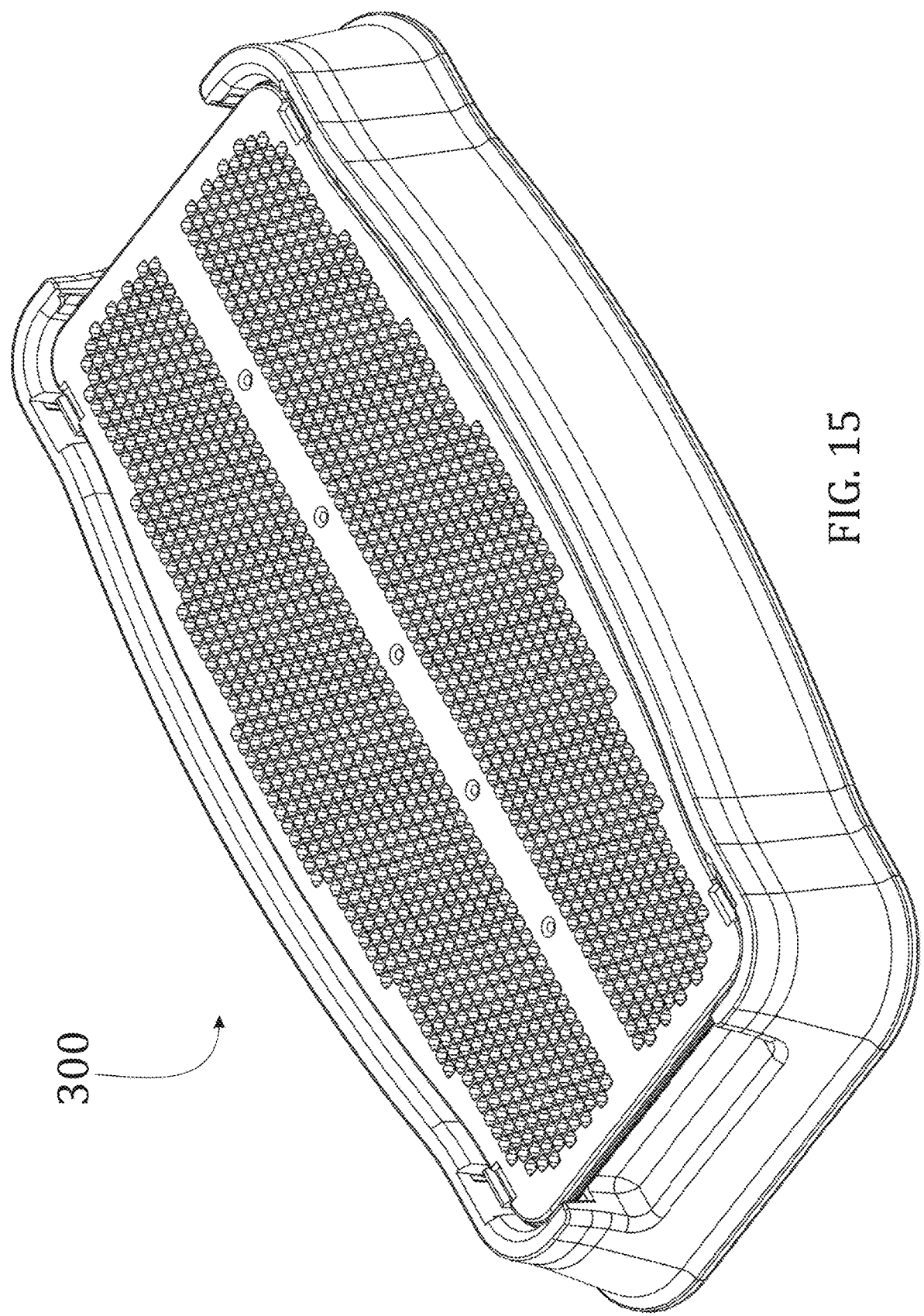
FIG. 15 is a perspective view of the alternative custom message food press device of FIG. 14.
Figure 16:
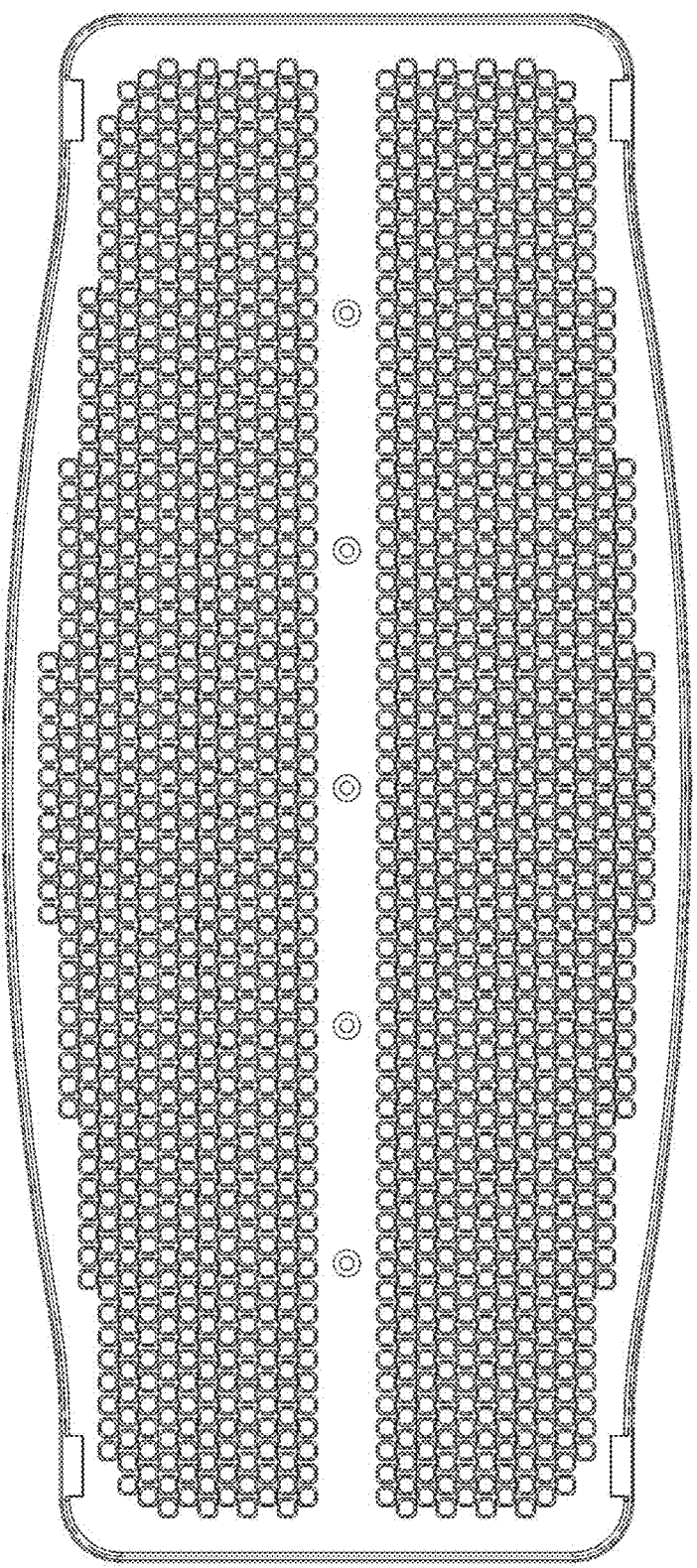
FIG. 16 is a top view of FIG. 14.
Figure 17:
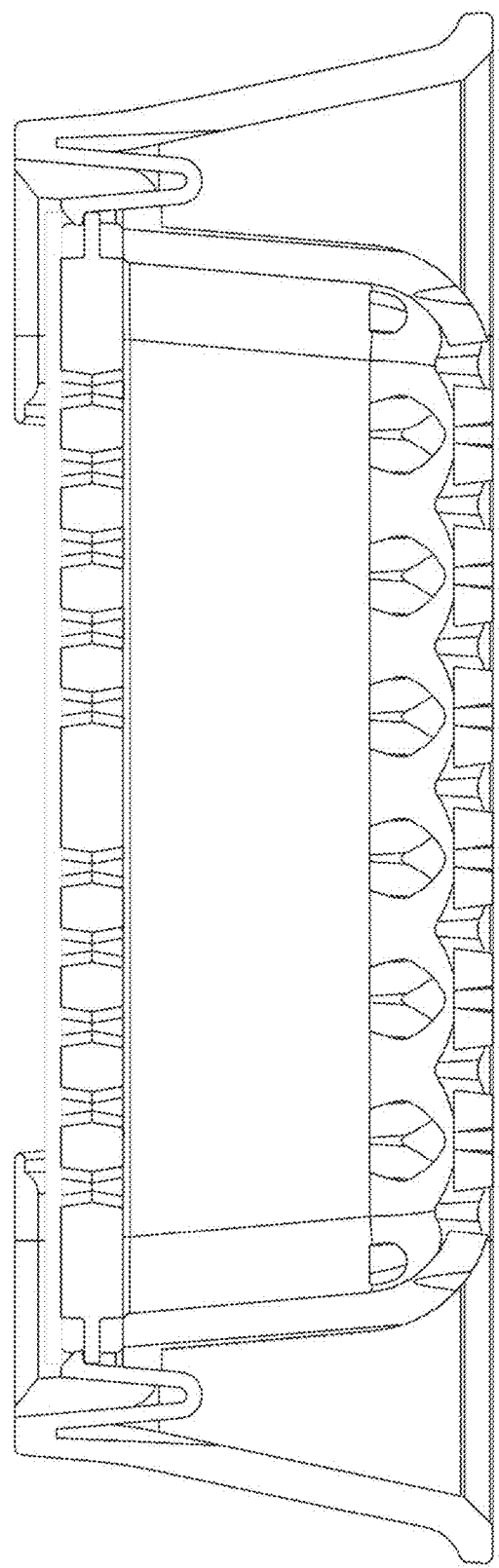
FIG. 17 is a section view of the device of FIG. 14 widthwise.
Figure 18:
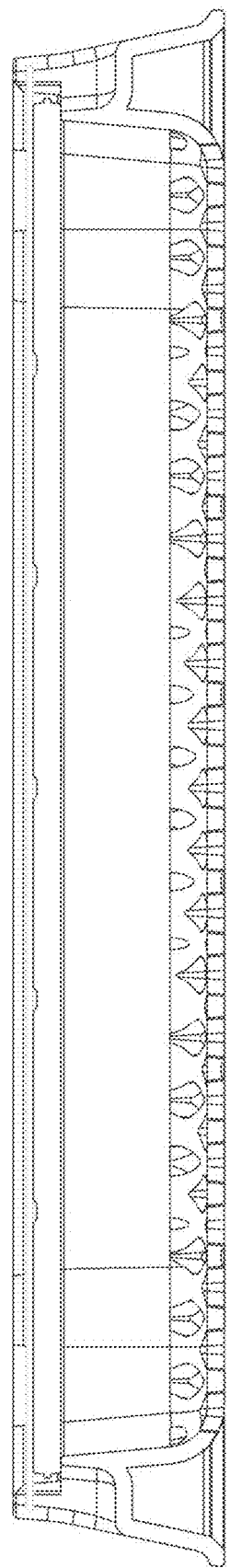
FIG. 18 is a sectional view of the device of FIG. 14 lengthwise.
Figure 19:
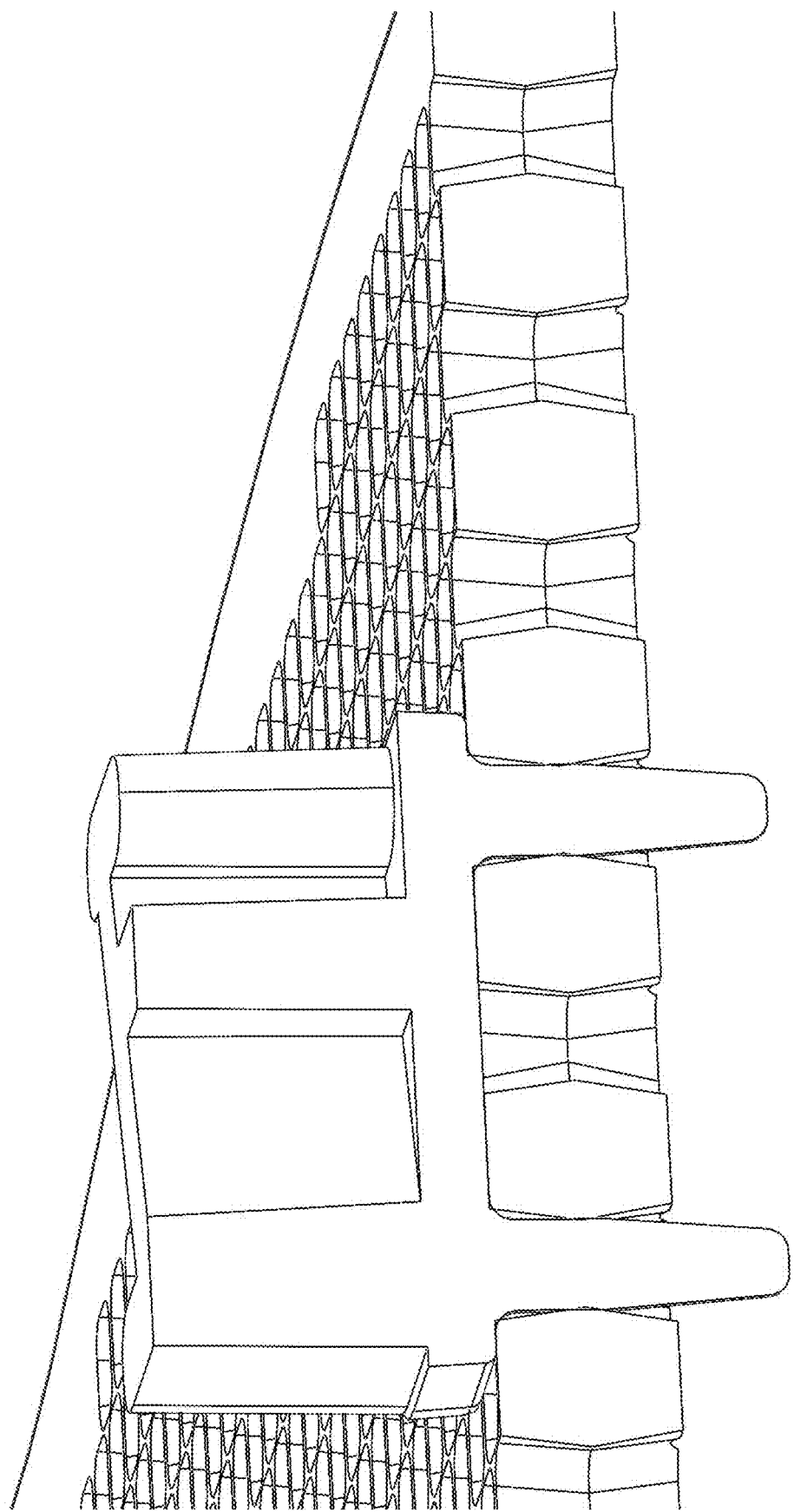
FIG. 19 is a section view showing an impression element within the device of FIG. 14.

Referring now to FIGS. 12-13, a custom message food plate with an alternate ejection panel 102B is provided. The alternate ejection panel 102B is constructed from a rigid material, rather than the semi-flexible material previously discussed. Advantageously, the alternate ejection panel 102B is configured to eject the plurality of impression elements when the alternate ejection panel is fully closed via the latch mechanism or similar means. To accomplish this, the alternate ejection panel comprises a curved underside surface.

Referring now to FIGS. 14-19, an alternative custom message food press device 300 is illustrated. The alternative custom message food press device 300 includes the main components as previously discussed including a carrier peg board 301, an ejection panel 302, and cleaning crate 303. In this embodiment, the carrier peg board 301 is reduced in size compared to the carrier peg board previously discussed (101; FIG. 1), and includes no handles and is configured to be doubled sided. The material selection is unchanged. In this embodiment, the ejection panel 301 is a thin flexible flat part constructed and cut from sheets, rather than molded to reduce costs. It should be constructed from a tough, transparent material of any color, such as PC, PETg, PMMA, or similar. In this embodiment, the cleaning crate 103 is reduced to a single part having plastic mesh 304 directly molded into the part. No latch mechanism is provided, however, both the carrier peg board 301 and ejector panel 302 are configured to snap into attachment elements 305 on the cleaning crate 303. Each part is independent and can be fully removed if desired. In one embodiment, the ejector panel 302 may be attached to the cleaning crate 303 without the carrier peg board 301 providing a lid for storage. Otherwise, the alternative device 300 operates similarly as previously discussed. Logos or other insignia may be provided on any element of the device.

Although the invention has been described in considerable detail in language specific to structural features, it is to be understood that the invention defined in the appended claims is not necessarily limited to the specific features described. Rather, the specific features are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternative embodiments are contemplated, and can be made without departing from the spirit and scope of the invention. For example, although the invention is intended for use with food, it is also able to impress into and onto other non-food media and materials with similar properties, such as fondant, play dough, clay, wax, soap, chocolates, uncured cement, thick—pasty glues, etc.

It should further be noted that throughout the entire disclosure, the labels such as left, right, front, back, top, bottom, forward, reverse, clockwise, counterclockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, references to "first," "second," "third," and etc. members throughout the disclosure (and in particular, claims) are not used to show a serial or numerical limitation but instead are used to distinguish or identify the various members of the group.

What is claimed is:

1. A custom message food press device comprising:
   a plurality of impression elements configured to impress into a food substrate;
   a carrier plate having an attachment surface configured to enable an attachment of the plurality of impression elements arranged for use on the carrier plate such that a custom message may be impressed into the food substrate by a user;
   a base having a top opening; and
   an ejector panel having a top surface, a bottom surface, a hinge mechanism, and a locking mechanism, the ejector panel is configured to eject the attached plurality of impression elements from the carrier plate into the base through the top opening, wherein the bottom surface of the ejector panel is configured to provide a push force against the plurality of impression elements within the carrier plate via the locking mechanism engaged with the base in a locked position, wherein the ejector panel and the carrier plate are configured to removably attach to the base, and the ejector panel is pivotable in relation to the base via the hinge mechanism.

2. The custom message food press device of claim 1, wherein the base includes a bottom mesh surface.

3. The custom message food press device of claim 2, wherein the base acts as a cleaning crate and storage area for the plurality of impression elements.

4. The custom message food press device of claim 3, wherein the bottom mesh surface enables water to pass though the base when the base is functioning as the cleaning crate.

5. The custom message food press device of claim 1, wherein each impression element of the plurality of impression elements includes a first side having imprinting geometry and a second side having a peg, wherein the first side is opposite the second side.

6. The custom message food press device of claim 5, wherein the carrier plate includes a plurality of peg receiving holes, wherein each peg receiving hole is configured to removably attach the peg.

7. The custom message food press device of claim 1, wherein the ejector panel is constructed from a transparent material.

8. The custom message food press device of claim 7, wherein the ejector panel is constructed from a semi-rigid material.

9. The custom message food press device of claim 5, wherein the imprinting geometry includes a raised perimeter edge.

\* \* \* \* \*